June 23, 1959 W. A. DUNCAN 2,891,371
LAWN MOWER
Filed March 11, 1957 2 Sheets-Sheet 2
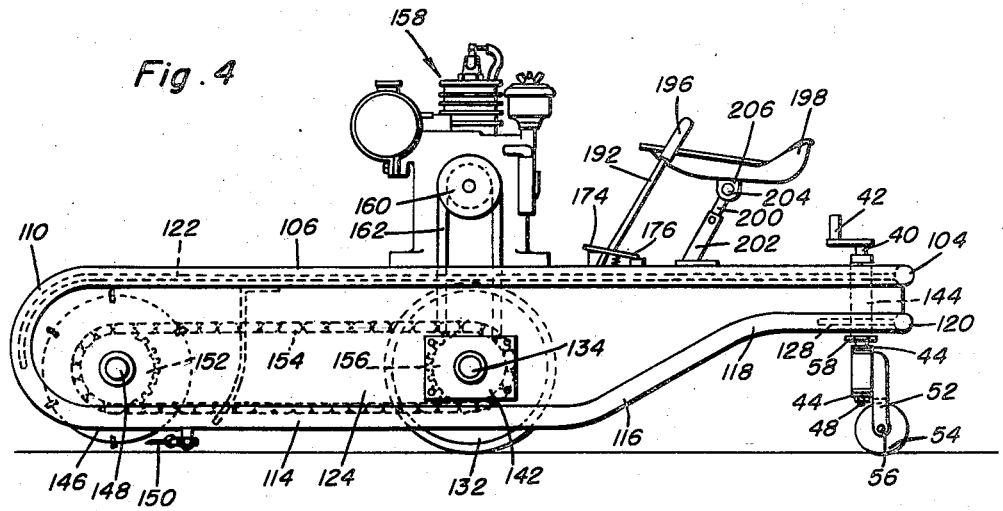
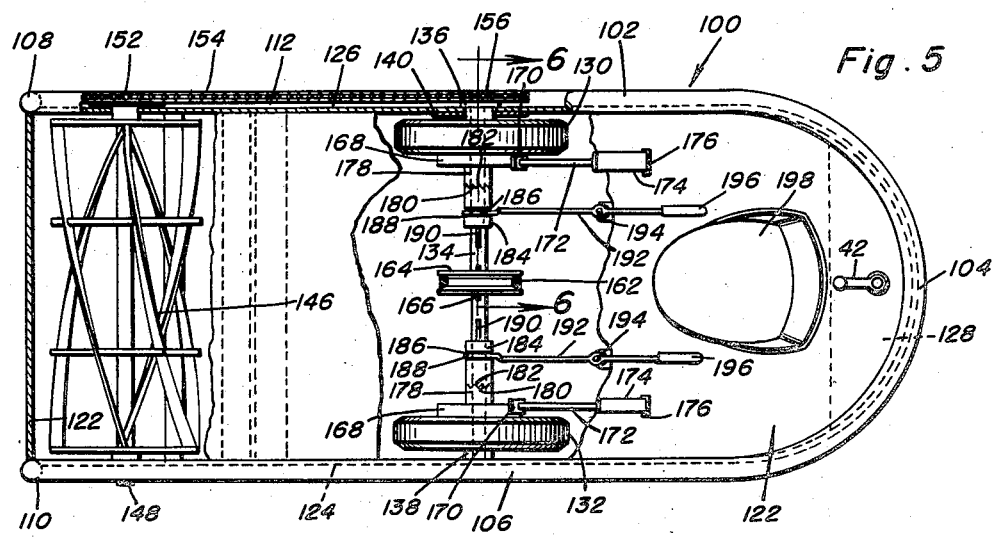
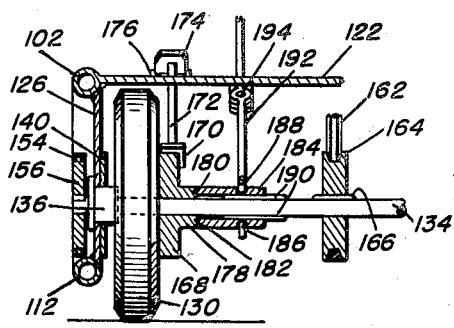
William A. Duncan
INVENTOR.

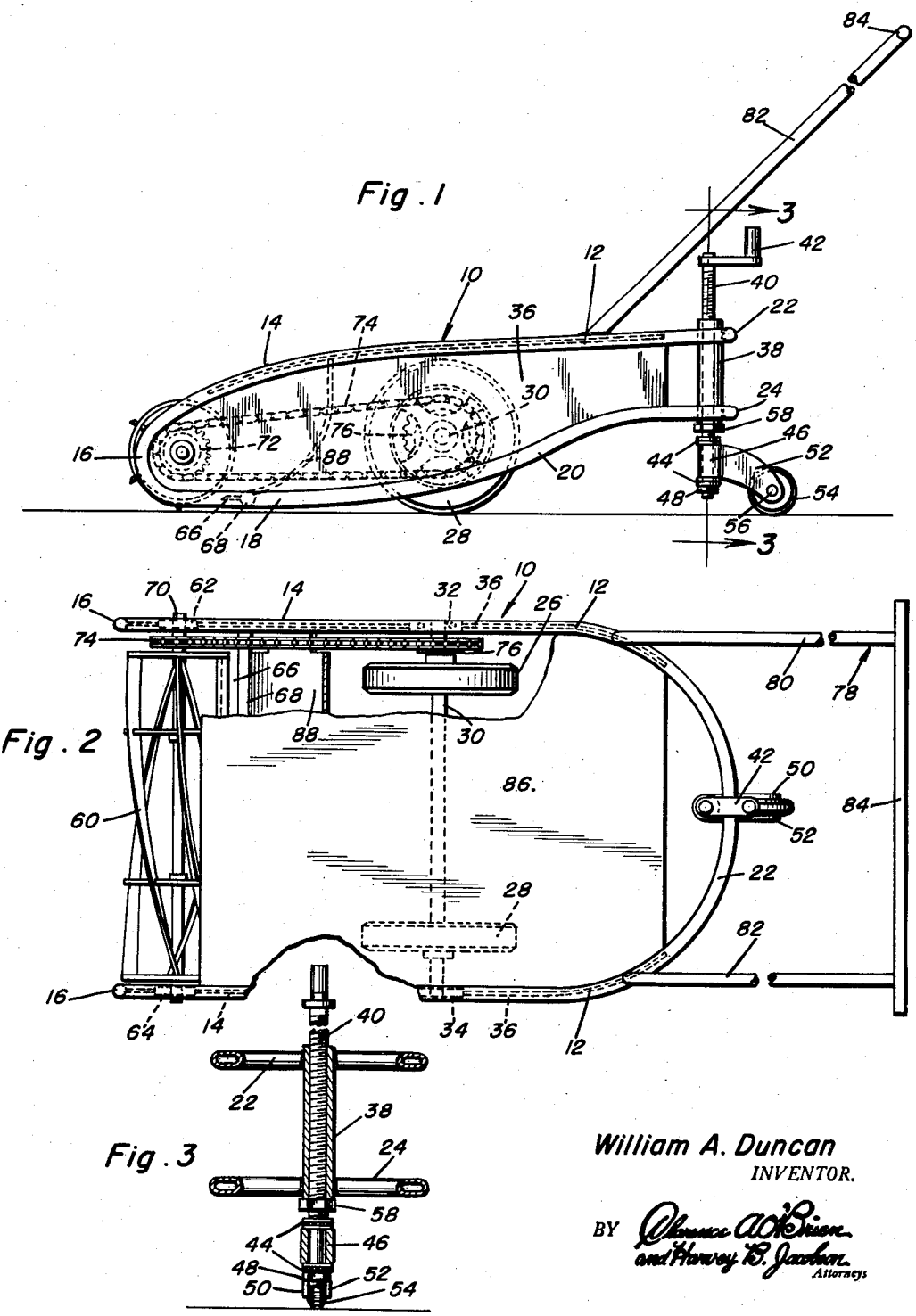

United States Patent Office

2,891,371
Patented June 23, 1959

2,891,371

LAWN MOWER

William A. Duncan, Ukiah, Calif.

Application March 11, 1957, Serial No. 645,155

4 Claims. (Cl. 56—252)

This invention relates in general to lawn mowers and more particularly to an improved lawn mower suspension and cutting height adjustment.

The primary object of this invention is to provide a lawn mover, either manually operated or motor driven, having a novel three-wheel suspension which may be easily adjusted to provide the cutting height of the reel of the lawn mower.

A further object of this invention is to provide a lawn mower of the reel type which will mow the lawn in close proximity to buildings and fences, thus making it unnecessary to trim the edges of the lawn.

A further object of this invention is to provide a power driven lawn mower which may be ridden by the operator and which has a novel steering arrangement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevation of a hand operated lawn mower, with portions of the mower shown in dotted lines to more clearly define the structure therein;

Figure 2 is a top plan view of the lawn mower shown in Figure 1, with portions broken away for clarity;

Figure 3 is an enlarged sectional view taken substantially along section line 3—3 of Figure 1 which illustrates the height adjusting feature of the mower;

Figure 4 is a side elevation of a second embodiment of the invention, which is power operated and ridden by the operator;

Figure 5 is a top plan view of the mower shown in Figure 4 with portions broken away to clearly show a clutch and brake mechanism of the mower;

Figure 6 is an enlarged sectional view taken substantially along section line 6—6 of Figure 5 to show all of the features of the clutch and brake assembly in detail.

Referring now to the drawings in detail, it will be seen that the lawn mower consists of a tubular frame, which is referred to in general by the reference numeral 10. The frame 10, when viewed from above, appears U-shaped in configuration, with the open end of the U being to the front or forward part of the mower. The frame 10 consists of one continuous tubular element, which when viewed from the side has a substantially horizontal upper member 12 comprising a pair of reaches which extends toward the front of the mower and which reaches at their forward ends curve downward slightly, as at 14, and then terminate in U-bends 16 which are at the extreme forward end of the mower. The U-bends 16 terminate in a lower horizontal frame member 18 also comprising a pair of reaches and which extend toward the rear of the mower and curve upwardly, as at 20. It should be understood that the portions 18 and 20 of the lower member underlie the portions 14 and 12 of the upper member, with the portions 12 and 20 terminating in horizontal bight portions 22 and 24, respectively. Inasmuch as both sides of the frame 10 are identical in construction and configuration, like reference numerals have been used for identification thereof. The frame 10 is carried by a pair of ground-engaging wheels 26 and 28 which are disposed on a transverse axle 30. The axle 30 is approximately midway between the forward and rear end of the mower. The axle 30 is attached to the frame 10 at each side thereof by means of journals 32 and 34 which, in turn, are carried by a vertical upstanding sheet metal wall 36. The sheet metal wall 36 extends between the upper and lower frame members and from the nose 16 backward, where it terminates adjacent to the upper member 12. It should be understood that the wheels 26 and 28 are fixed on the shaft 30.

The bight portions 22 and 24 have extending therebetween, at the approximate longitudinal center line of the mower, a vertical sleeve 38. The sleeve 38 is internally threaded and receives therein an elongated adjusting screw 40. The adjusting screw 40 has attached at its upper end a hand crank 42. The screw 40 at the lower end thereof has a reduced portion on which there is disposed a pair of thrust bearings 44 with a tubular member 46 therebetween. It should be noted that the thrust bearings 44 and the tubular member 46 are maintained in position on the screw 40 by means of a retainer nut 48 disposed on the lower end of the screw 40. The tubular member 46 has formed integral therewith a pair of downwardly and outwardly extending ears 50 and 52, which are in parallel spaced relation and receive therebetween a dolly wheel 54 carried on an axle 56. It should be noted in Figure 3 that the adjusting screw 40, intermediate the lower end of the vertical member 38 and the upper thrust bearing, is provided with a lock nut 58. It should be readily understood that the screw 40 may be prevented from rotating with relation to the sleeve 38 by means of tightening the lock nut 58 against the lower shoulder of the sleeve 38.

Closely adjacent to the forward end of the mower there is provided a reel type cutter 60 which is journaled in bearing blocks 62 and 64, also carried by the side plates 36. As is best seen in Figure 1, a cutter bar 66, closely adjacent to the reel blades and carried by a cylindrical transverse bar 68, is provided below and to the rear of the reel 60. Inasmuch as the structure of the reel and the cutter bar is conventional in nature, it will not be described in detail. It should be noted, however, that the shaft 70, which has the reel 60 attached thereto, also carries a sprocket 72 which is engaged by an endless chain 74, which in turn engages a second sprocket 76 which is fixed to the shaft 30. It should be noted that the mower is also provided with a push type handle, which is referred to in general by the reference numeral 78 and has two upwardly and backwardly extending tubular members 80 and 82 which terminate in a transverse horizontal push bar 84.

In addition to the side plates 36, the mower is also provided with an upper cover 86 and a grass cutting guard 88 which curves upward and backward from the transverse tube 68 to the cover 86.

Referring now to Figures 4, 5 and 6, which show a second embodiment of the invention, which is a power operated, riding type mower. It will be noted that the riding mower consists of a frame, which is referred to in general by the reference numeral 100, and when viewed in plan consists of a U-frame having an upper horizontal tubular straight portion 102, a rear bight portion 104, and a second straight portion 106 which comprises the left side of the mower. When viewed in side elevation, the portions 102 and 106 terminate in reverse bends 108 and 110, respectively, which in turn terminate in lower horizontal members 112 and 114, respectively. The lower member 114 terminates in an angular bend 116 and then proceeds upward and backward at an angle to a second bend 118, which in turn terminates in a second U-bend 120, which is in underlying relation to the U-bend 104 and parallel in a horizontal plane thereto. To strengthen and reinforce the frame 100 and to carry a power plant, operating levers and the operator's seat, all of which will be described in more detail hereinafter, there is provided a heavy gauge sheet metal floor plate 122 which conforms to the shape of the upper portions of the frame 100 and is welded or otherwise suitably attached thereto. The plate 122 extends from U-bends 110 to the U-bend 104 and is of sufficient strength to reinforce the frame 100 and carry the necessary weight thereon. To further strengthen the frame 100, vertical side plates 124 and 126 are provided. The side plates 124 and 126 extend from the U-bends 110 and 108, respectively, back to the center of the U-bend 104, conforming to the vertical shape and spacing between the side members 102 and 112 and the side members 106 and 114. A third plate member 128 is disposed in the U-portion 120, being semicircular in configuration and suitably attached to the frame, as by welding. The purpose of this plate is to be described hereinafter.

The mower is supported by a right wheel 130 and a left wheel 132 which are carried on a transverse axle 134 which in turn is carried by journals 136 and 138 and journal plates 140 and 142, respectively. The journal plates 140 and 142 are suitably attached to the vertical side members 126 and 124 respectively. It should be understood that the axle 134 is disposed, with relation to the frame, so as to allow most of the weight to be to the rear thereof.

At the rear of the mower and carried by the plates 122 and 128 there is provided a vertically disposed sleeve 144. Inasmuch as the sleeve 144 is identical with and carries structure which serves the same purpose as the structure which is carried by sleeve 38 in the first embodiment, as shown in Figures 1 through 3, this portion of the power mower will not be described, but like numerals will be used thereon.

There is provided at the forward end of the mower a reel type cutter 146, which is attached to a transverse shaft 148 which is parallel to the shaft 134. The shaft 148 is suitably journaled in the side plates 124 and 126. There is provided to the rear of and below the reel type cutter a cutter bar 150. The cutter bar 150 is adjustably attached to the frame members 112 and 114, in any suitable manner such as that shown in Godwin, 2,335,054. Attached to the right end of the reel shaft 148 there is a driven sprocket 152 which is drivingly engaged by an endless chain 154. The chain 154 is driven by means of drive sprocket 156 which is fixed to shaft 134.

The plate 122 carries a suitable power source, which is referred to in general by the reference numeral 158, and is drivingly connected to the shaft 134 by means of a drive pulley 160, an endless V-belt 162 and a driven pulley 164. The driven pulley 164 is keyed to the shaft 134 by means of a key 166. While a gasoline engine is shown as the type of power used, it should be understood that electric or other suitable power could be used instead.

Inasmuch as both the right and left wheels 130 and 132 are driven, clutched, declutched and braked by identical mechanisms, the structure and operation of one wheel only will be described and like reference numerals used on both wheels. Referring now to Figure 6, it will be noted that the right wheel 130 is shown. The wheel 130 is free to rotate on the axle 134 and has attached thereto a brake disk 168 which is engageable by a brake shoe 170 which is foot operated by means of a brake rod 172. The brake rod 172 extends upward through the plate 122 and is attached to a foot pedal 174, which is pivotally attached, as at 176, to the plate 122. The brake disk 168 terminates in an inwardly extending, reduced portion 178. The portion 178 terminates in a serrated face 180. Serrated radial teeth 180 are engageable by matching serrated teeth 182 of a combined dog clutch throw out bearing bushing 184. The bushing 184 is provided with a circumferential groove 186 which is engaged by a throw out yoke 188. It should be understood that the throw out bushing 184 is laterally slidable on the shaft 134, but drivingly connected thereto by means of keys 190 or splines or other suitable means. The throw out yoke is formed integral with an operating rod 192 which is pivotally attached below the plate 122 to that plate by means of a pivot pin 194. The upper end of the operating rod 192 is provided with a suitable hand grip 196.

Mounted to the rear of and in such a position as to be convenient for the operator to operate the brake pedals 174 and the clutch handle 196, there is provided a seat 198 which is adjustably attached to the plate 122 by means of a vertical rod 200 which is telescopically received in a socket 202 at the lower end thereof.

The socket 202 is fixed to the plate 122. The upper end of the rod 200 is pivotally attached to the seat 198 by means of a pivot pin 204 which extends through the rod 200 and a pair of bifurcated, depending ears 206.

While the operation of either embodiment of the invention should be obvious, a brief description of the manner in which the height of cut may be adjusted will now be described. First, it should be understood that a three-point support for both mowers is provided by means of the traction wheels and the single wheel 54 of the dolly, both mowers being so balanced as to have the greatest percentage of weight towards the rear of the mower. When the operator is desirous of changing the height of cut of the grass to be cut, it is merely necessary to loosen the lock nut 58, grasp the crank 42 and turn in the direction desired. In this manner, the rear of the mower is raised or lowered, with the axle 30 or 134 providing the pivot point, thereby lowering or raising the front end of the mower and the cutter bar. After the desired height is reached, the screw 40 may be locked by means of the lock nut 58.

When operating the second embodiment of the invention, that is, the riding mover, both clutches may be disengaged, the power unit started and then, if a straight cut is desired, both clutches may be engaged. When a gradual turn is desired, the clutch on that particular side may be disengaged and the mower, due to the driving force of the opposite wheel, will turn in that direction. However, if a sharp turn is desired, the clutch may be disengaged and the brake applied at the same time on that particular side, thus causing the mower to pivot somewhat on that wheel.

It should be noted that in all embodiments of the invention there are no projections outside of the frame, thereby lessening the chance of scarring trees, buildings or fences when utilizing the mowers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lawn mower comprising a frame, a rotatable cutter blade assembly rotatably journaled on the front end of said frame and disposed beneath the front end thereof, an axle provided with support wheels rigidly secured thereto, said axle being journaled on the mid-portion of said frame, driving means operatively connecting said axle to said cutter blade assembly, means connected to said frame for effecting rotation of said axle and thereby of said cutter blade assembly, said frame having upper and lower rearwardly projecting frame members, a support dolly mounted on the rear portion of said frame members, means connected to said frame and dolly for vertical adjustment of said dolly, said last mentioned means comprising an internally threaded vertical sleeve secured to and disposed between said frame members, an adjusting shaft threaded in and extending through said sleeve, said dolly being swiveled on the lower end of said adjusting shaft, said frame comprising a continuous elongated tube, said members having upper and lower pairs of reaches extending longitudinally on both sides of the device, each pair of upper and each pair of lower reaches being connected at the rear end by a continuously curved section of tubing, said upper and said lower reaches on each side being connected to each other at the front end by a continuously curved section of tubing.

2. The combination of claim 1 including a wall disposed between and fixedly secured to the surfaces of said upper and lower frame reaches.

3. The combination of claim 2 including an upper cover fixedly secured to and disposed between said upper reaches and substantially enclosing the upper portion of the frame.

4. The combination of claim 3 wherein said means for effecting rotation of said axle comprises a push type handle having two upwardly and backwardly extending tubular members connected to the rear portion of said frame, said tubular members terminating in a transverse horizontal push bar which when pushed will cause frictional engagement of the wheels with their supporting surface, thereby causing the wheels to rotate.

References Cited in the file of this patent
UNITED STATES PATENTS

| | | |
|---|---|---|
| 12,963 | Peabody | May 29, 1855 |
| 148,915 | Armstrong et al. | Mar. 24, 1874 |
| 745,566 | Boggess | Dec. 1, 1903 |
| 900,443 | Steuben | Oct. 6, 1908 |
| 1,095,097 | Fournet | Apr. 28, 1914 |
| 1,656,517 | Goulet | Jan. 17, 1928 |
| 1,779,583 | Blydenburgh | Oct. 28, 1930 |
| 1,886,408 | Locke et al. | Nov. 8, 1932 |
| 1,992,494 | Lundin | Feb. 26, 1935 |
| 2,071,872 | Cockburn | Feb. 23, 1937 |
| 2,313,590 | Sherer et al. | Mar. 9, 1943 |
| 2,335,054 | Godwin | Nov. 23, 1943 |
| 2,538,230 | Boggs | Jan. 16, 1951 |
| 2,559,920 | Hainke | July 10, 1951 |